Уnited States Patent Office 2,976,213
Patented Mar. 21, 1961

2,976,213

INJECTABLE SKELETAL MUSCLE RELAXANT

Robert S. Murphey, Richmond, Va., assignor to A. H. Robins Company, Inc., Richmond, Va., a corporation of Virginia No Drawing. Filed Nov. 18, 1959, Ser. No. 853,707

10 Claims. (Cl. 167—65)

The present invention relates to an injectable composition for parenteral therapy comprising an effective amount of methocarbamol in a polyalkylene glycol solvent. More particularly the invention is concerned with compositions comprising methocarbamol (U.S. Patent No. 2,770,649 Murphey, "Robaxin,"® A. H. Robins Company, Inc.) and polyethylene glycol 300 ("Carbowax,"® PEG 300, Carbide and Carbon Chemicals Company).

Skeletal muscle relaxants of the mephenesin type are well known and are exemplified by mephenesin, mephenesin carbamate (U.S. Patent No. 2,609,386, Lott et al.), methocarbamol (U.S. Patent No. 2,779,649 Murphey) and similarly acting zoxazolamine. Specifically, the action of 2-hydroxy-3-(o-methoxyphenoxy)-propyl carbamate appears to be primarily on the interneurons of the spinal cord and the compound blocks multisynaptic reflexes in doses having no effect on the monosynaptic flexion reflexes.

The previous form available for methocarbamol, namely, tablets for oral ingestion, was satisfactory in many cases but where immediate action was desired, it became necessary to provide a parenteral form for intravenous or intramuscular administration. The solvent vehicle for methocarbamol must satisfy certain stringent requirements. Firstly, it must be capable of dissolving methocarbamol in sufficient concentration to provide for adequate dosage with the smallest possible total volume and should also be available for aqueous glucose dilution. Secondly, the solvent vehicle should be nontoxic or free from contaminants and when injected should not engender hemolysis or clotting and in normal usage should not produce vascular extravasation. Thirdly, the viscosity of the solvent vehicle should be such that it permits administration of the active medicament. Finally, the compositions must have sufficient stability or shelf life to provide marketable items to the pharmaceutical industry.

The selection and discovery of a compatible solvent answering the above requirements proved to be difficult. Several known solvents for medicaments such as N,N-dimethylacetamide and propylene glycol were tried and found to be unsatisfactory for one or more reasons. Finally, attention was directed to polyethylene glycol compositions. (Alternatively termed polyoxyethylene.) These compositions are commonly abbreviated as PEG 200, PEG 300, PEG 400, etc., wherein the suffix indicates the mean moleuclar weight of the molecule in the particular form utilized. These materials may be obtained commercially from Carbide and Carbon Chemicals Company under the trade name prefix Carbowax®. The PEG compounds of a molecular weight less than 1000 are fluids suitable for injectable purposes. The general chemical formula representing any PEG may be written in a variety of ways. One form is shown as follows: $HOCH_2CH_2(OCH_2CH_2)_nOH$. With PEG 200 $n$ is approximately equal to 3.

Research indicated that the only PEG composition satisfactory for methocarbamol and answering the above mentioned criteria of solubility, toxicity and stability was PEG 300. This material has a specific gravity of 1.125 20/20° C. and a viscosity of 5.8 centistokes at 210° F. It is bland, compatible with water and methocarbamol, and non-toxic. Finally, the viscosity when blended with approximately 50% water is satisfactory being in the range of about 3.0. PEG 200 was deemed unsatisfactory as containing greater amounts of such toxic impurities as ethylene glycol and diethylene glycol and PEG 400 proved to be unsuitable because the composition was so viscous that it could not be pulled into the syringe through the needle.

Operable ranges for the methocarbamol-PEG 300 composition were found to be as follows: Using 50% aqueous PEG 300 as a base, the percentage of methocarbamol must be from about 5% to about 12% by weight. The lower range is governed by problems of packaging and of getting a sufficient quantity of the drug per volume into the blood stream whereas the upper limit is governed by the solubility and stability of the methocarbamol in solution.

The operable range for PEG 300 is from about 40 to 55% aqueous solution. Again the lower range is governed by the problems of solubility of methocarbamol and the upper range is governed by increased blood hemolysis. A preferred composition is one containing 10% methocarbamol by weight in 50% aqueous PEG 300. Thus, a preferred dosage unit in ampul form contains from about 0.5 to 1.2 grams of methocarbamol in 10 cc. of 40 to 55% aqueous polyethylene glycol.

Although not essential, it may be convenient to add to the basic liquid compositions a minor amount of an antioxidant such as sodium bisulfite as an added protection for shelf stability. Other pharmaceutically acceptable antioxidants approved for use in parenteral solutions include methyl hydroxybenzoate and propyl hydroxybenzoate and mixtures of the same. Methocarbamol offers a significant advantage as to solubility in polyethylene glycol solutions over related skeletal muscle relaxants and thus the compositions are unique in this respect. For instance, whereis methocarbamol is stable in solution to about 12% by weight in 50% aqueous PEG 300, it was found that meprobamate was soluble to the extent of only about 3%; zoxazolamine about 1.5% and chlormethazanone, carisoprodol and chlorzoxazone each less than 1%.

The compositions of the present invention afford unique utility in offering in injectable form a skeletal muscle relaxant preparation to relieve the acute phase of skeletal muscle spasm.

The prior art picture into which the present invention falls can be differentiated:

British Patent No. 784,659 deals generally with suspensions of penicillins and cortisone compounds and where polyethylene glycols of molecular weight less than 1000 are utilized the amount of said polyethylene glycols is limited to 20 to 30% by weight.

U.S. Patent No. 2,788,309, Cooper, pertains to multi-component compositions of the tranquilizing drug reserpine together with specific proportions of PEG 300, citric acid and benzyl alcohol.

U.S. Patent No. 2,791,531, Bellard, pertains to multi-component compositions of the antibiotic, erythromycin thiocyanate, a local anesthetic and a polyethylene glycol compound.

U.S. Patent No. 2,856,329, Taylor et al., is concerned with methods of injecting anhydrous compositions containing steroid hormones and a polyethylene glycol into the human body.

None of the prior art developments teaches polyethylene glycol compositions embodying skeletal muscle relaxants such as methocarbamol and related methods of treatment within the critical limits asserted in the present invention.

Therefore:

It is an object of the present invention to provide a fast acting parenteral form for administering a skeletal muscle relaxant such as methocarbamol.

It is a further object of the present invention to provide stable, nontoxic dosage unit forms (ampuls) for parenteral injection of skeletal muscle relaxants such as methocarbamol.

It is still a further object of the present invention to provide injectable compositions of skeletal muscle relaxants such as methocarbamol which when combined with the known oral forms of said relaxants provide prompt and continued relief of skeletal muscle hyperactivity.

The injectable form of methocarbamol skeletal muscle relaxant has been utilized successfully in combating various acute and recurrent muscle spasms. The preparation has been found useful, for example, in acute muscle spasm occurring in the lumbosacral area, posterior neck and bursitis, and in spasm involving the deltoid hip and thigh muscles. Additionally, recurrent muscle spasm associated with strains and sprains of the shoulders, neck, back and extremities has been treated successfully with the compositions. Methocarbamol injectable also finds use in relief of skeletal muscle hyperactivity associated with neurological conditions such as acute alcoholism.

Generally, the injectable compositions of the present invention may be administered by any of the methods of parenteral therapy although intravenous and intramuscular means are preferred as being most effective. When administered by the intravenous route, it may be given undiluted at a maximum of about 3 cc./minute or in an intravenous drip of sodium chloride injection (sterile isotonic sodium chloride solution for parenteral use) or 5% dextrose injectable (sterile 5% dextrose solution). For relief of moderate skeletal muscle spasm, a dose of 1 gram/day is usually adequate (1 gram in 10 cc. dosage unit ampul) although severe conditions may require up to 3 grams a day for three days. Following a 48 hour lapse, such maximum dosage may be repeated.

When used for intramuscular injection, the ordinary and recommended dosage is 0.5 gram injected into each gluteal region and may be repeated at eight hour intervals if desired.

Methocarbamol injectable has been found to be remarkably free from side effects and is contraindicated only in case of renal impairment. The injectable composition has found good use for initial quick relief in conjunction with subsequent sustained thereapy by oral means.

The following examples illustrate the invention:

*Example I.—10% methocarbamol in 50% PEG 300 ampuls*

Ampuls containing 10 cc. of methocarbamol injectable were prepared in the following manner and the final composition contained:

1.0 gram of methocarbamol
0.01 gram sodium bisulfite
5.0 cc. polyethylene glycol 300, N.F.
Water for injection (to 10 cc.), U.S.P.

The injectable compositions were prepared in batches suitable for 100 ampuls in the following manner using 100 grams of methocarbamol: 1 gram sodium bisulfite, U.S.P., 500 cc. polyethylene glycol 300, N.F., and water for injection, U.S.P. to make 1000 cc.

The entire weight of methocarbamol was added to 90% of the theoretically required volume of polyethylene glycol 300 and the material was dissolved as rapidly as possible by rapid stirring with an electric agitator. To the polyethylene glycol solution thus prepared, 90% of the theoretically required water for injection was added. Complete solution of the methocarbamol was accomplished without heat upon the addition of the water. The required weight of sodium bisulfite was added to the solution and complete mixing of constituents was accomplished by continuous, rapid stirring. After nitrogen assay the balance of water and polyethylene glycol was added to produce the requisite dilution and finished volume of solution.

The ampul solution was then filtered free of particulate matter and filled into previously sterilized 10 cc. colorbreak ampuls (U.S.P. Type I glass). Each ampul contained 10.5 cc. of solution to provide the customary excess of solution.

*Example II.—5% methocarbamol in 50% PEG 300 ampuls*

In the same manner as Example I, ampuls of the following composition may be prepared with the exception that no preservative is added:

| | Batch | Ampul |
|---|---|---|
| Methocarbamol___grams__ | 50 | .5 |
| Polyethylene glycol 300, N.F.___cc__ | 500 | 5.0 |
| Water for injection, U.S.P. to___cc__ | 1,000 | 10.0 |

*Example III.—1.2% methocarbamol in 50% PEG 300 ampuls*

In the same manner as Example I, ampuls of the following composition may be prepared:

| | Batch | Ampul |
|---|---|---|
| Methocarbamol___grams__ | 120 | 1.2 |
| Sodium Bisulfite, U.S.P.___do__ | 1 | .01 |
| Polyethylene glycol 300, N.F.___cc__ | 500 | 5.0 |
| Water for Injection, U.S.P. to___cc__ | 1,000 | 10.0 |

*Example IV.—10% methocarbamol in 40% PEG 300 ampuls*

In the same manner as Example I ampuls of the following composition may be prepared with the exception that no preservative is added:

| | Batch | Ampul |
|---|---|---|
| Methocarbamol___grams__ | 100 | 1.0 |
| Polyethylene glycol 300, N.F.___cc__ | 400 | 4.0 |
| Water for injection, U.S.P. to___cc__ | 1,000 | 10.0 |

*Example V.—10% methocarbamol in 55% PEG 300 ampuls*

In the same manner as Example I, ampuls of the following composition may be prepared with the exception that no preservative is added:

| | Batch | Ampul |
|---|---|---|
| Methocarbamol___grams__ | 100 | 1.0 |
| Polyethylene glycol 300, N.F.___cc__ | 550 | 5.5 |
| Water for Injection, U.S.P. to___cc__ | 1,000 | 10.0 |

The present invention is susceptible to all permissible alternatives and equivalents. Having thus described my invention, I claim:

1. A pharmaceutical preparation comprising a sterile aqueous solution of polyethylene glycol having a molecular weight of approximately three hundred containing about 40 to 55% by volume of said polyethylene glycol and a proportion of methocarbamol within the range of about 5% to about 12% by weight of said solution.

2. A pharmaceutical preparation according to claim 1 wherein the aqueous solution of PEG 300 consists of about 50% PEG 300 and the proportion of methocarbamol is about 10% by weight of said solution.

3. A pharmaceutical preparation according to claim 1 wherein a minor amount of an antioxidant is added to said preparation.

4. A skeletal muscle relaxant in dosage unit form comprising between about 0.5 gram to 1.2 grams per dosage unit of methocarbamol and a PEG 300 solvent carrier.

5. A skeletal muscle relaxant in dosage unit form comprising about one gram per dosage unit of methocarbamol in the form of a sterile solution thereof in aqueous polyethylene glycol having a molecular weight of approximately three hundred, said solution containing about fifty percent by volume of said polyethylene glycol and a minor amount of a pharmaceutically acceptable antioxidant, the methocarbamol constituting about ten percent by weight of the solution.

6. A skeletal muscal relaxant in dosage unit form comprising about one-half gram of 1.2 grams per dosage unit of methocarbamol in the form of a sterile solution thereof in aqueous polyethylene glycol having a molecular weight of approximately three hundred, said solution containing about forty to fifty-five percent by volume of said polyethylene glycol, the methocarbamol constituting from about five to about twelve percent by weight of the solution.

7. The method of effecting muscle relaxation which comprises parenterally injecting into a human body an effective dose of methocarbamol in the form of a sterile solution thereof in aqueous polyethylene glycol having a molecular weight of about three hundred, said polyethylene glycol being present in the range of about forty to fifty-five percent by volume of said solution and said methocarbamol being present in the range of about five to about twelve percent by weight of said solution.

8. The method according to claim 7 which, in addition, comprises simultaneously injecting a minor amount of an antioxidant incorporated with the solution.

9. The method of effecting muscle relaxation which comprises parenterally injecting into a human body an effective dose of methocarbamol in a dosage unit form comprising about one-half gram to 1.2 grams of methocarbamol per dosage unit, in the form of a sterile solution thereof in aqueous polyethylene glycol having a molecular weight of approximately three hundred, said polyethylene glycol constituting about forty to fifty-five percent by volume of said solution, the methocarbamol constituting from about five to about twelve percent by weight of the said solution.

10. The method of effecting muscle relaxation which comprises parenterally injecting into a human body an effective dose of methocarbamol in a dosage unit form comprising about one gram of methocarbamol per dosage unit, in the form of a sterile solution thereof in aqueous polyethylene glycol having a molecular weight of approximately three hundred, said polyethylene glycol constituting about fifty percent by volume of said solution, and said methocarbamol constituting about ten percent by weight of the solution, said solution also containing a minor amount of a pharmaceutically acceptable antioxidant.

References Cited in the file of this patent

UNITED STATES PATENTS

| | | |
|---|---|---|
| 2,770,649 | Murphey | Nov. 13, 1956 |
| 2,856,329 | Taylor et al. | Oct. 14, 1958 |

FOREIGN PATENTS

| | | |
|---|---|---|
| 784,659 | Great Britain | Oct. 16, 1957 |